(12) United States Patent
Makkonen et al.

(10) Patent No.: US 7,257,895 B2
(45) Date of Patent: Aug. 21, 2007

(54) APPARATUS FOR MACHINING, ESPECIALLY CUTTING TUBULAR AND ROUND SECTION BODIES

(75) Inventors: Seppo Makkonen, Helsinki (FI); Mika Priha, Helsinki (FI)

(73) Assignee: Exact Tools Oy, Helsinki (FI)

( * ) Notice: Subject to any disclaimer, the term of this patent is extended or adjusted under 35 U.S.C. 154(b) by 0 days.

(21) Appl. No.: 11/263,171

(22) Filed: Oct. 31, 2005

(65) Prior Publication Data

US 2006/0053998 A1 Mar. 16, 2006

Related U.S. Application Data

(63) Continuation of application No. PCT/FI2004/050029, filed on May 17, 2004.

(30) Foreign Application Priority Data

| May 22, 2003 | (FI) | ................................. 20035071 |
| Mar. 17, 2004 | (WO) | ................ PCT/FI2004/050029 |

(51) Int. Cl.
*B26D 3/16* (2006.01)
*B26D 3/00* (2006.01)
(52) U.S. Cl. ..................... 30/96; 30/92; 30/95; 30/101; 83/456; 269/242; 269/245
(58) Field of Classification Search .................. 30/92, 30/96, 97, 101, 102, 372; 269/242, 245, 269/252; 83/657, 54, 452, 456, 462, 466, 83/468.7, 648; 451/439
See application file for complete search history.

(56) References Cited

U.S. PATENT DOCUMENTS

| 1,075,384 | A | * | 10/1913 | Seidel ........................ 269/156 |
| 1,086,574 | A | * | 2/1914 | Anderson ................... 269/145 |
| 1,322,370 | A | * | 11/1919 | Strathern .................... 269/218 |
| 1,423,933 | A | * | 7/1922 | Heatlie ....................... 269/218 |
| 2,456,882 | A | * | 12/1948 | Mackey ....................... 30/90.6 |
| 3,243,878 | A | * | 4/1966 | Bjalme et al. ................. 30/95 |
| 3,608,194 | A | * | 9/1971 | Miller ........................... 30/94 |
| 4,105,358 | A | * | 8/1978 | Walker ....................... 408/108 |
| 4,278,246 | A | * | 7/1981 | Blake ......................... 269/220 |
| 4,345,376 | A | * | 8/1982 | Benson et al. ................. 30/96 |
| 4,625,464 | A | * | 12/1986 | Kubo ......................... 451/441 |
| 4,682,919 | A | * | 7/1987 | Mitchell ..................... 409/179 |
| 2003/0093904 | A1 | * | 5/2003 | Makkonen ..................... 30/96 |

FOREIGN PATENT DOCUMENTS

| FI | 990167 | | 1/1999 |
| FI | 1990167 | * | 1/1999 |
| JP | 410156747 A | * | 6/1998 |

* cited by examiner

*Primary Examiner*—Boyer D. Ashley
*Assistant Examiner*—Edward Landrum
(74) *Attorney, Agent, or Firm*—Marshall A. Lerner; Marvin H. Kleinberg; Kleinberg & Lerner, LLP

(57) ABSTRACT

An apparatus for cutting workpieces adapted to engage the workpiece in at least four points of surface engagement. The apparatus has a clamping mechanism designed to be fastened to the workpiece. The clamping mechanism has a tool unit attached which includes adjustment means for displacing the tool unit relative to the clamping mechanism towards or away from the workpiece. The clamping mechanism has a frame element and arms extending from the clamping mechanism. Each of the four arms includes a bearing wheel. Each of the wheels may be used to engage a workpiece to retain its position while it is being cut.

10 Claims, 3 Drawing Sheets

APPARATUS FOR MACHINING, ESPECIALLY CUTTING TUBULAR AND ROUND SECTION BODIES

This application is a continuation of PCT application no. PCT/FI2004/050029 filed May 17, 2004 which in turn relies for priority on Finland application no. 20035071 filed May 22, 2003.

The invention relates to an apparatus for working, especially cutting tubular and round-bar type pieces, said apparatus comprising a clamping mechanism adapted to be fastened to said workpiece rotatably therearound and said clamping mechanism having attached thereto a tool unit, which is provided with adjustment means for displacing said tool unit relative to the clamping mechanism towards or away from the workpiece, and said clamping mechanism including a frame element and first and second arms extending therefrom, said arms being articulated at one end to the frame element of the clamping mechanism and each arm has its free end fitted with a bearing axle, which is provided with at least one bearing wheel, the clamping mechanism having its frame element provided in a rotatable and axially immobile fashion with a threaded shaft, whose first end has a right-handed thread provided with a first nut and whose second end has a left-handed thread provided with a second nut, and said threaded shaft being provided with a member for rotating the threaded shaft, and the first arm and the first nut being articulated to each other by means of a first suspension arm and the second arm and the second nut being articulated to each other by means of a second suspension arm.

This type of apparatus is prior known from the Applicant's WO publication 02/02271 A1. There, the clamping mechanism is adapted to bear against a pipe to be cut by means of wheels mounted on the adjustable arms of the clamping mechanism, as well as by means of wheels mounted fixedly on the frame of the clamping mechanism. Thus, the fastening mechanism engages a pipe basically at three points. An optional solution has also been proposed, in which the frame element is fixedly provided with two parallel axles, having wheels mounted thereon.

This apparatus has functioned excellently with small pipe dimensions, but with the largest pipe dimensions accepted by the apparatus, and especially with major resultant cutting forces, the gripping geometry is not fully satisfactory. In this prior solution, the torsional forces resulting from cutting cannot be fully overcome. In this situation, the resultant cutting forces apply a wrenching force to the apparatus, which is why the cutting surface cannot be made absolutely straight.

These problems are eliminated by means of an apparatus of the invention, which is characterized in that the apparatus further comprises two second bearing axles, fitted adjustably relative to their mutual distance between the arms and the frame element, each of said axles being provided with at least one bearing wheel. By virtue of its adjustability, the apparatus can be fastened around a pipe to be cut in an optimal fashion regardless of the size of the pipe.

In a particularly preferred arrangement, the working force produced by a blade of the tool unit applies to the workpiece a force, in response to which the workpiece presses against the bearing wheels mounted on said second bearing axles. Consequently, the overall flexures remain as insignificant as possible.

In an arrangement preferred with regard to simple operation of the apparatus, said second bearing axles are adapted to be adjusted by means of the threaded shaft concurrently with the bearing axles present at the ends of the arms.

Preferably, each of said second bearing axles is connected to one of the nuts of the threaded shaft. Alternatively, each of said second bearing axles is connected to one of the arms.

In one particularly preferred embodiment of the invention, the arrangement is such that at least one of the bearing wheels of the bearing axles is adapted to rotate in one direction only. This arrangement enables preventing a relative rotation of the tool unit and/or the pipe in a wrong direction, which would result in exceptional working forces that could develop flexures, which in turn would have an adverse effect on the resulting cut surface.

The tool unit comprises preferably a circular saw, a bandsaw, or a piercing saw.

The invention will now be described in more detail with reference to the accompanying drawing, in which.

Figure 1:
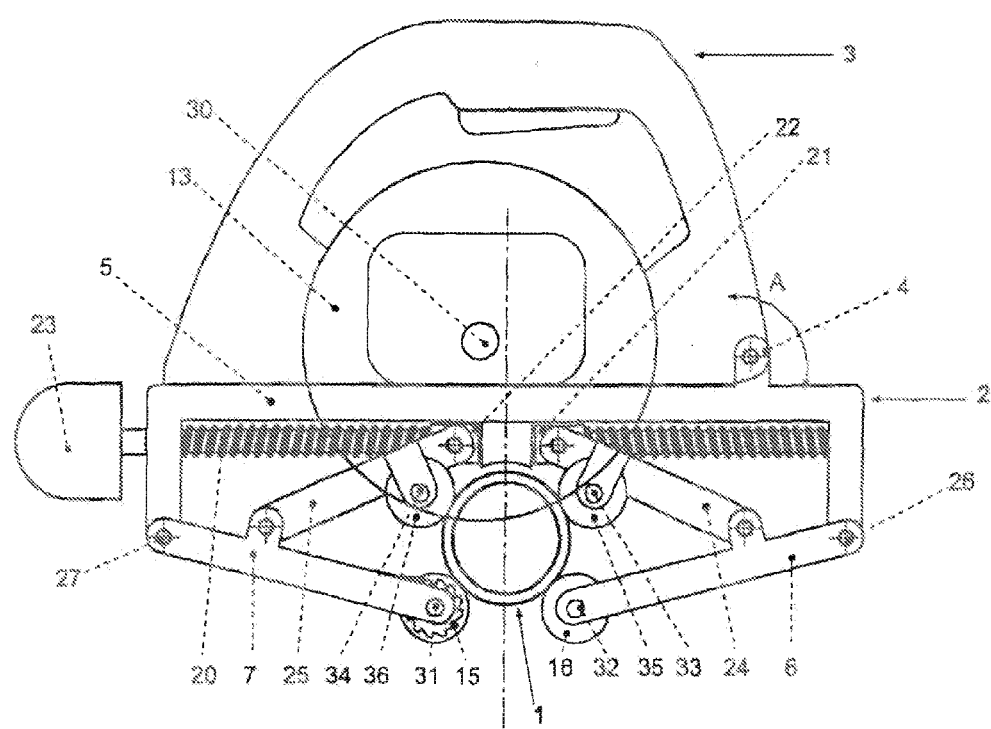
FIG. 1 shows an apparatus according to one embodiment of the invention, in an end view.

With regard to the apparatus constituting the object of the invention for working tubular or round-bar type pieces, the drawing illustrates an embodiment, in which the apparatus is used for cutting a pipe 1. A tool unit 3, in the embodiment shown in FIGS. 1-3, comprises a circular saw and in this example the apparatus is designed as a hand tool.

Figure 3:
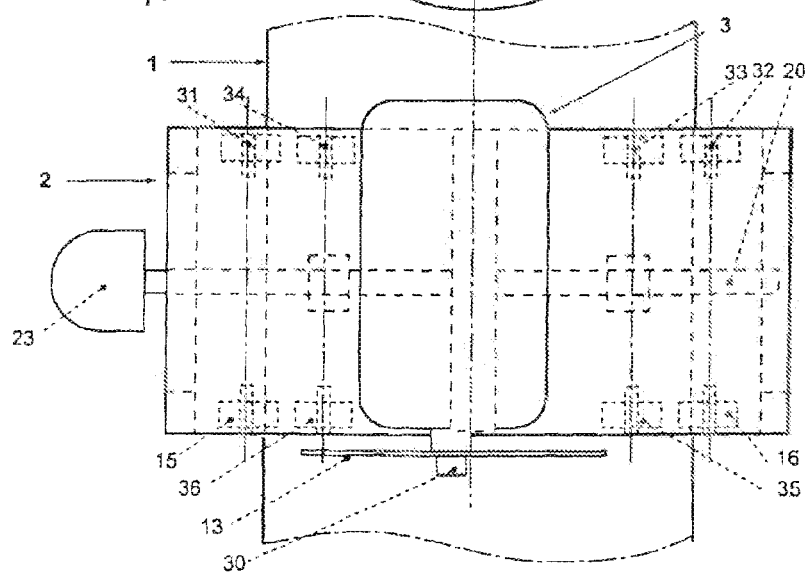
FIG. 3 shows the apparatus of FIG. 2 in a plan view.

The apparatus comprises a clamping mechanism, represented generally with reference numeral 2, which is adapted to be fastened to the pipe 1 rotatably therearound. Rotation occurs in such a way that the apparatus retains its position in the axial direction of the pipe. Wheels 15, 16, 35, 36 included in the clamping mechanism, the number of each of which in the illustrated exemplary embodiment is two, as evident from FIG. 3, are mounted with bearings in such a way that, when pressed against the pipe's 1 external surface, the clamping mechanism 2 can be rotated in a plane perpendicular to the centre axis of the pipe 1 or, respectively, the pipe 1 can be rotated relative to the clamping mechanism 2.

Figure 2:
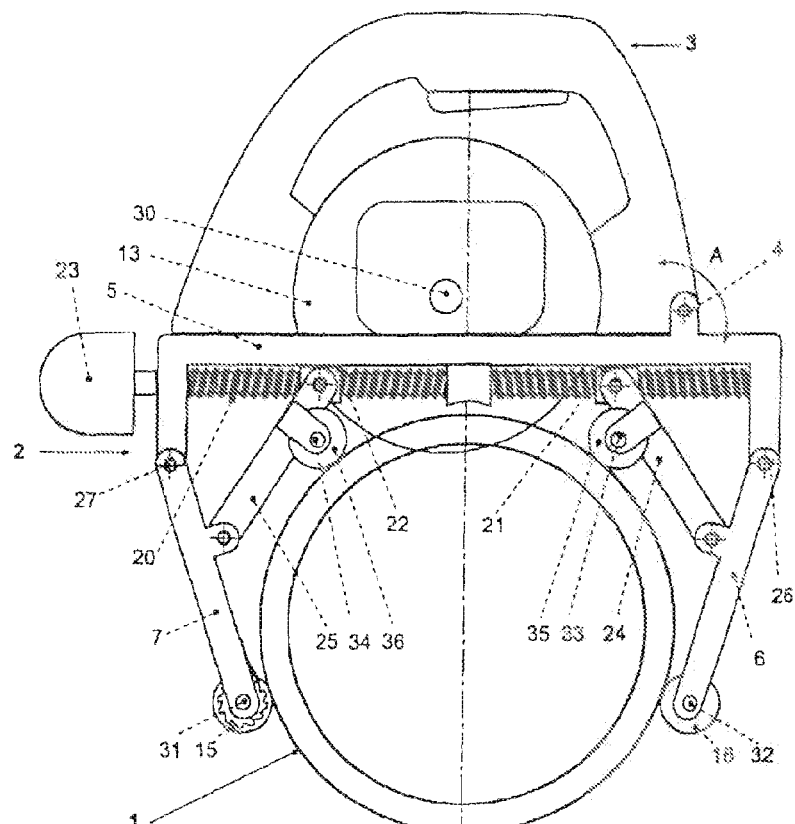
FIG. 2 shows the apparatus of FIG. 1 provided with a larger pipe to be cut.

The clamping mechanism 2 is fitted with a tool unit 3, which in the illustrated example comprises a circular saw pivotably mounted by way of an axle 4 to the clamping mechanism 2 for displacing the saw 3 relative to the clamping mechanism 2 towards or away from the pipe 1 (an arrow A, FIG. 2). The saw 3 has its blade 13 adapted to operate from outside a common rolling path of the wheels 15, 16, 35, 36.

The clamping mechanism 2 includes a frame element 5, and first and second arms 6, 7 extending therefrom, said arms being articulated at one end thereof to the frame element 5 of the clamping mechanism 2 and the free end of each arm 6, 7 being fitted with a bearing axle 31, 32, on which is mounted at least one bearing wheel 15, 16.

In addition, the apparatus includes two second bearing axles 33, 34, fitted adjustably relative to their mutual distance, each of said axles being provided with at least one bearing wheel 35, 36.

Said second bearing axles 33, 34 are fitted between the arms 6, 7 in the proximity of the frame element 5, such that the working force developed by the tool unit's 3 blade 13 applies to the workpiece 1 a force, in response to which the workpiece 1 presses against the bearing wheels 35, 36 mounted on said second bearing axles 33, 34.

Said second bearing axles 33, 34 are adapted to be adjusted by means of a threaded shaft 20 concurrently with the bearing axles 31, 32 present at the ends of the arms 6, 7.

Each of said second bearing axles 33, 34 is connected to one of the threaded shaft's 20 nuts 21, 22 either directly (not shown) or indirectly as shown in the drawing, each of said second bearing axles 31, 32, 33, 34 being connected to one of the arms 6, 7.

The clamping mechanism 2 has its frame element 5 fitted rotatably and axially immovably with the threaded shaft 20. The threaded shaft 20 has its first end provided with a right-handed thread for a first nut 21 and its second end with a left-handed thread for a second nut 22. The threaded shaft 20 is provided with a member 23, in the illustrated example with a turning knob, for rotating the threaded shaft 20.

For speeding up an opening and closing action effected by means of the turning knob 23, the threaded shaft may have in its end a gear system with specific gear ratios for a high-speed movement and an actual engagement.

The first arm 6 and the first nut 21 are articulated to each other by means of a first suspension arm 24. Respectively, the second arm 7 and the second nut 22 are articulated to each other by means of a second suspension arm 25.

Pivot axles 26, 27 between the arms 6, 7 and the clamping mechanism's 2 frame element 5 are parallel to the bearing axles 31, 32, 33, 34. Each bearing axle 31, 32, 33, 34 may carry one or more wheels 15, 16, 35, 36. In the illustrated example, the wheels 15, 16, 35, 36 are arranged pairwise, as depicted in FIG. 3.

In the example shown in the drawing FIGS. 1-3, the tool unit 3 comprises a circular saw, which is mounted on the clamping mechanism 2 pivotably relative to the axle 4 parallel to its axis of rotation 30 and the centre axis of the workpiece 1 presently in a working or processing position.

Figure 5:
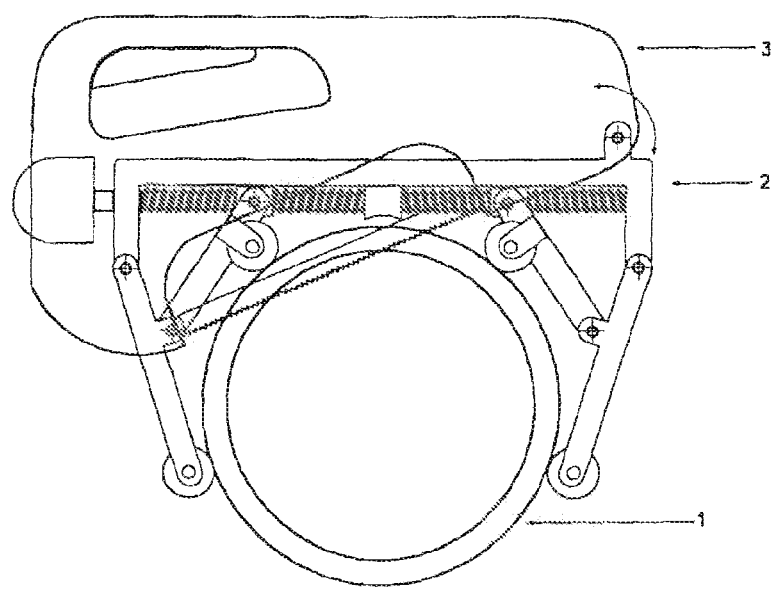
FIG. 5 shows an apparatus of the invention, in which the tool unit comprises a bandsaw.

In a particularly preferred case, the tool unit 3 may also comprise a bandsaw (FIG. 5), specifically for making it easier to process materials whose sawing is difficult, for improving the quality of a sawn surface, and also for almost a total elimination of sparking, which is important especially in cutting operations at construction sites.

Figure 4:
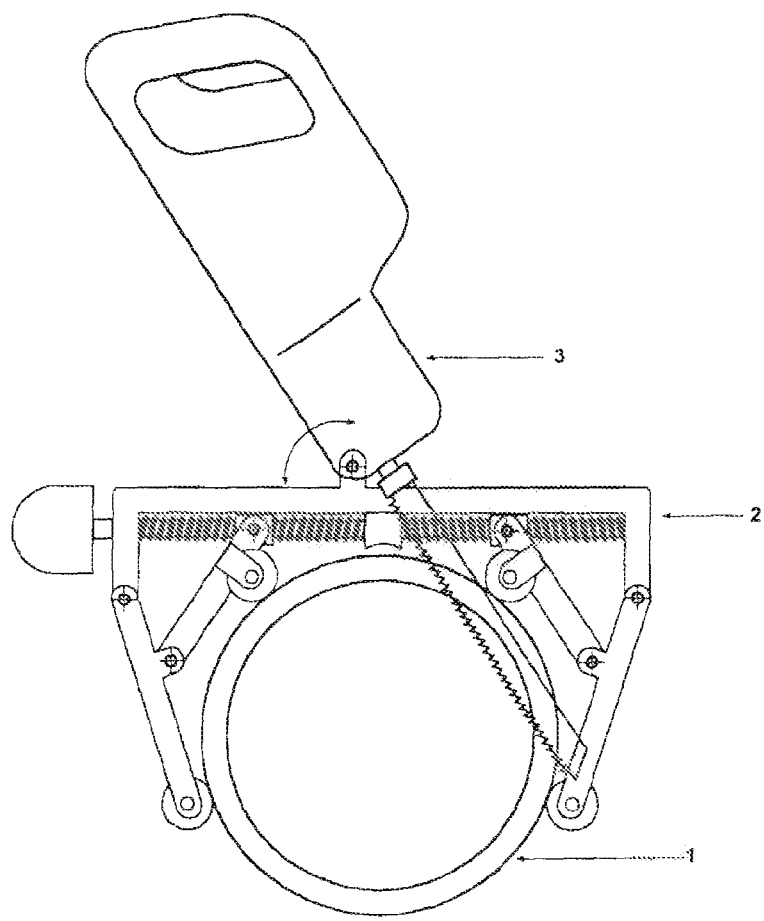
FIG. 4 shows an apparatus of the invention, in which the tool unit comprises a piercing saw.

In some applications, it may be relevant to use a piercing saw (FIG. 4) instead of a bandsaw. Another advantage gained by these two saws over a circular saw is that, if necessary, the sawing process can be easily supplied with a cutting fluid. In connection with a circular saw, the use of a cutting fluid is virtually impossible.

At least one 15 of the bearing wheels 15, 16, 35, 36 mounted on the bearing axles 31, 32, 33, 34 is adapted to rotate in one direction only, by means of a per se known ratchet device. This enables a relative rotation of the apparatus and the workpiece 1 in one direction only. Thus, such a wheel enables preventing incorrect operation of the apparatus and deformation possibly caused by adverse cutting forces resulting therefrom and irregularities in the cut surface caused thereby.

The inventive apparatus operates as follows.

The clamping mechanism 2, along with its saw 3, is laid on top of the pipe 1 at a desired cutting point and the clamping mechanism 2 is fastened thereon by means of the turning knob 23. Rotation of the turning knob 23 causes the nut 21 present in the right-handed section of the threaded shaft 20 and the nut 22 present in its left-handed section to move either towards or away from each other, depending on the turning direction. Transmitted by the suspension arms 24, 25 and the arms 6, 7, the motion progresses also to the wheels 15, 16, 35, 36, which respectively move either closer to or further away from each other. By rotating the turning knob 23, the wheels 15, 16, 35, 36 can thus be brought to press at a desired force against the pipe's 1 external surface.

Once the clamping mechanism 2 has been fastened to the pipe 1, the saw 3 can be pivoted towards the pipe 1 relative to the axle 4 included in the frame element 5 of the clamping mechanism 2, whereby the saw's 3 blade penetrates through the pipe's 1 wall to its bottom position, which is depicted in FIGS. 1 and 2 and which is adjustable in a per se known manner. This is followed by circling the clamping mechanism 2, along with its saw 3, around the pipe 1 or, as generally considered more beneficial, the pipe 1 is rotated with the saw 3 remaining stationary until the pipe 1 breaks off.

The invention claimed is:

1. An apparatus for cutting a workpiece (1), said apparatus adapted to engage said workpiece at four points of surface engagement thereof, said apparatus comprising a clamping mechanism (2) adapted to be fastened to said workpiece (1) rotatably therearound and said clamping mechanism (2) having attached thereto a tool unit (3), which is provided with adjustment means (4) for displacing said tool unit (3) relative to the clamping mechanism (2) towards or away from the workpiece (1), and said clamping mechanism (2) including a frame element (5) and first and second arms (6, 7) extending therefrom, said arms (6, 7) being articulated at one end to the frame element (5) of the clamping mechanism (2) and each arm (6, 7) has its free end fitted with a bearing axle (31, 32) respectively, which is provided each with one bearing wheel (15, 16) respectively wherein each of said bearing wheels (15,16) provide one point of said four points of surface engagement, the clamping mechanism (2) having its frame element (5) provided in a rotatable and axially immobile fashion with a threaded shaft (20), whose first end has a right-handed thread provided with a first nut (21) and whose second end has a left-handed thread provided with a second nut (22), and said threaded shaft (20) being provided with a member (23) for rotating the threaded shaft (20), and the first arm (6) and the first nut (21) are attached to each other by means of a first suspension arm (24) and the second arm (7) and the second nut (22) are attached to each other by means of a second suspension arm (25), characterized in that the apparatus further comprises two second bearing axles (33, 34), fitted adjustably relative to their mutual distance between the arms (6, 7) respectively one attached to each suspension arm (24, 25) and the frame element (5), each of said second bearing axles being provided with at least one bearing wheel (35, 36) respectively wherein each of said wheels provides one point of said four points of surface engagement.

2. An apparatus as set forth in claim 1, characterized in that said second bearing axles (33, 34) are fitted between the arms (6, 7) respectively adjacent to the frame element (5), such that the working force produced by a blade (13) of the tool unit (3) applies to the workpiece (1) a force, in response to which the workpiece presses against the bearing wheels (35, 36) respectively mounted on said second bearing axles (33, 34) respectively.

3. An apparatus as set forth in claim 1, characterized in that said second bearing axles (33, 34) are adapted to be adjusted by means of the threaded shaft (20) concurrently with the bearing axles (31, 32) respectively present at the ends of the arms (6, 7) respectively.

4. An apparatus as set forth in claim 1, characterized in that one (15) of the bearing wheels (15, 16, 35, 36) mounted on the bearing axles (31, 32, 33, 34) respectively is adapted to rotate in one direction only.

5. An apparatus as set forth in claim 1, characterized in that the tool unit (3) comprises a circular saw.

6. An apparatus as set forth in claim 1, characterized in that the tool unit (3) comprises a band saw.

7. An apparatus as set forth in claim 1, characterized in that the tool unit (3) comprises a piercing saw.

8. An apparatus for as described in claim 1, characterized in that said arms (6, 7) are attached to said frame element (5) by means of two axles (26, 27) respectively and wherein said two arms (6, 7) are designed in such a way as to be unable to be extended such that said two arms (6,7) are parallel to said frame element (5).

9. An apparatus as set forth in claim 1, characterized in that each of said bearing wheels (15, 16) and bearing axles (31, 32) are duplicated in a plane substantially parallel to said bearing wheels (15, 16) and bearing axles (31, 32) to thereby create a second set of bearing wheels (15, 16) and bearing axles (31, 32) wherein said bearing wheels (15, 16) and bearing axles (31, 32) and said second set of bearing wheels (15, 16) and bearing axles (31, 32) hold the workpiece (1) at a desired angle to the tool unit (3).

10. An apparatus as set forth in claim 9, characterized in that each of said second bearing axles (33, 34) and said second bearing wheels (35, 36) are duplicated in a plane substantially parallel to said second bearing axles (33, 34) and said second bearing wheels (35, 36) to thereby create a second set of second bearing axles (33, 34) and second bearing wheels (35, 36) wherein said second bearing axles (33, 34) and said second bearing wheels (35, 36) and said second set of second bearing axles (33, 34) and second bearing wheels (35, 36) hold the workpiece (1) at a desired angle to the tool unit (3).

\* \* \* \* \*